HIGH DENSITY NETWORK SIMULATION APPARATUS

Filed May 8, 1964 11 Sheets-Sheet 1

INVENTORS.
JAMES A. OGLE
WELD S. CARTER JR.
BY Carl Fissell Jr.
AGENT

INVENTORS.
JAMES A. OGLE
WELD S. CARTER JR.
BY Carl Fissell Jr.
AGENT

HIGH DENSITY NETWORK SIMULATION APPARATUS

INVENTORS.
JAMES A. OGLE
WELD S. CARTER JR
BY
Carl Fissell Jr.
AGENT

June 6, 1967 J. A. OGLE ET AL 3,324,457

HIGH DENSITY NETWORK SIMULATION APPARATUS

Filed May 8, 1964 11 Sheets-Sheet 4

INVENTORS.
JAMES A. OGLE
WELD S. CARTER JR.
BY Carl Fissell Jr.
AGENT

INVENTORS.
JAMES A. OGLE
WELD S. CARTER JR.
BY Carl Fissell Jr.
AGENT

HIGH DENSITY NETWORK SIMULATION APPARATUS

INVENTORS
JAMES A. OGLE
WELD S. CARTER JR
BY
Carl Fissell
AGENT

INVENTORS.
JAMES A. OGLE
WELD S. CARTER JR.
BY
Carl Fissell Jr.
AGENT

INVENTORS.
JAMES A. OGLE
WELD S. CARTER JR.
BY
Carl Fissell Jr.
AGENT

HIGH DENSITY NETWORK SIMULATION APPARATUS

Filed May 8, 1964

INVENTORS.
JAMES A. OGLE
BY WELD S. CARTER JR.
Carl Fissell Jr.
AGENT

INVENTORS.
JAMES A. OGLE
WELD S. CARTER JR.
BY Carl Fissell Jr.
AGENT

INVENTORS.
JAMES A. OGLE
WELD S. CARTER JR
BY
Carl Kissell Jr.
AGENT

United States Patent Office 3,324,457

Patented June 6, 1967

3,324,457

HIGH DENSITY NETWORK SIMULATION APPARATUS

James A. Ogle, Paoli, Pa., and Weld S. Carter, Jr., Nutley, N.J., assignors to Burroughs Corporation, Detroit, Mich., a corporation of Michigan Filed May 8, 1964, Ser. No. 366,025
11 Claims. (Cl. 340—172.5)

This invention relates to network simulation apparatus and, more particularly, although not necessarily exclusively, to apparatus for simulating high density neural networks and networks of neuron-like elements.

Studies of neural networks and networks of neuron-like components involve the manipulation of a relatively large number of highly interdependent variables. The problems encountered therein cannot be handled by existing mathematical techniques. The development of further understanding and insight into the behavior of such systems requires either construction of actual models, or simulation of such systems. Construction of operational models involves considerable risk because the necessity or desirability of modifying some of the parameters of the components employed may be discovered only after they have been assembled into functioning nets at which time even minor modifications of component properties may be extremely difficult and expensive. Network changes of actual models also involve considerable difficulty.

Simulation of these networks appears therefore to be the only effective and practical way to study such complex systems. Simulation on general purpose computers has and is being conducted. However, this approach has its own difficulties. As the networks increase in complexity, simulation rapidly becomes rather expensive. The possibility of significant interaction between the operator and the progress of the simulation becomes impractical on the high speed machines. A special purpose simulator designed specifically to avoid these difficulties appears to be the most advantageous solution.

It is an object therefore, of the present invention to solve the foregoing problems in a new and novel manner by means of a novel and heretofore unknown combination of apparatus.

It is an additional object of the invention to provide neural network simulation apparatus which has a relatively high density and a relatively large capacity.

It is a further object of the invention to provide network simulation apparatus wherein the network connections and elements can be easily changed or interchanged to facilitate experimentation.

An additional object of the invention is to provide network simulation apparatus constructed of different types of elements not limited to the components or characteristics of any specific element.

It is also an object of the present invention to provide a photo-optical neural network simulation apparatus wherein the elemental portions thereof may be changed, exchanged and interchanged to provide various permutations and combinations of experimentation without the necessity of construction of individual network elements.

Still another object of the invention is to provide a distributed network processor in which the neural network interconnections may be recorded photographically and read optically in a desired sequence for multitudinous simulations.

It is also an object of the invention to provide a distributed network processor which is capable of simulating large numbers of arbitrary connections with as many as 200 to 10,000 elements or neuron-like elements.

In accordance with the foregoing objects and first briefly described, the present invention comprises neural network simulation apparatus including a neural network and a network connection distributor. The neural network is a set of connected neuron-like elements each of which is adapted to receive inputs from other elements, including itself, and inputs from outside the network. The network connection distributor comprises a plurality of operably associated subsystems including a system output field, an optical filter, and a system input field. The system output field is an array of discrete spots on the face of a cathode ray tube arranged in such a manner that the output of each element in the network is represented by a light spot, i.e. a value of illumination, in a given area on the face of the tube. The output field remains illuminated for a sufficient time to permit recovery of the output signals therefrom. The optical filter or connectivity distributor is an optical system located between the output field and the input field. One embodiment of the optical filter is a photographic film or plate which has imaged on it the cathode ray tube (not necessarily as a single image) serially by a relay lens system, as two or more consecutive images in different orientations. If there is a transparent point on the film in one stage when the first image of the cathode ray tube is formed, light will be transmitted through this point, and if this same point, or a map of this same point occurs in a second and any succeeding stage as well, then light will be transmitted from the spot on the cathode ray tube to a light sensitive device disposed adjacent thereto which is adapted to provide serial inputs to the elements of the neural network. When light is transmitted from the system output field through the optical filter, a given light sensitive element is activated which then serves as the input for the neuron-like element with which it is or may be associated. Thus the film or plate or plates completely determines the connectivity of the network by specifying the origin of each element input. The film or plate can conveniently and economically be changed to provide a completely new network.

Means is also provided for weighting the element inputs and for summing such weighted inputs so that new output information can thereby be obtained and thereafter reapplied to the output field so as to provide a new set of illumination values in the output field.

These and other objects and advantages of the invention will be better understood from the following specification and claims taken in conjunction with the accompanying drawings showing a preferred form of the invention, wherein:

GENERAL DESCRIPTION

Figure 1:
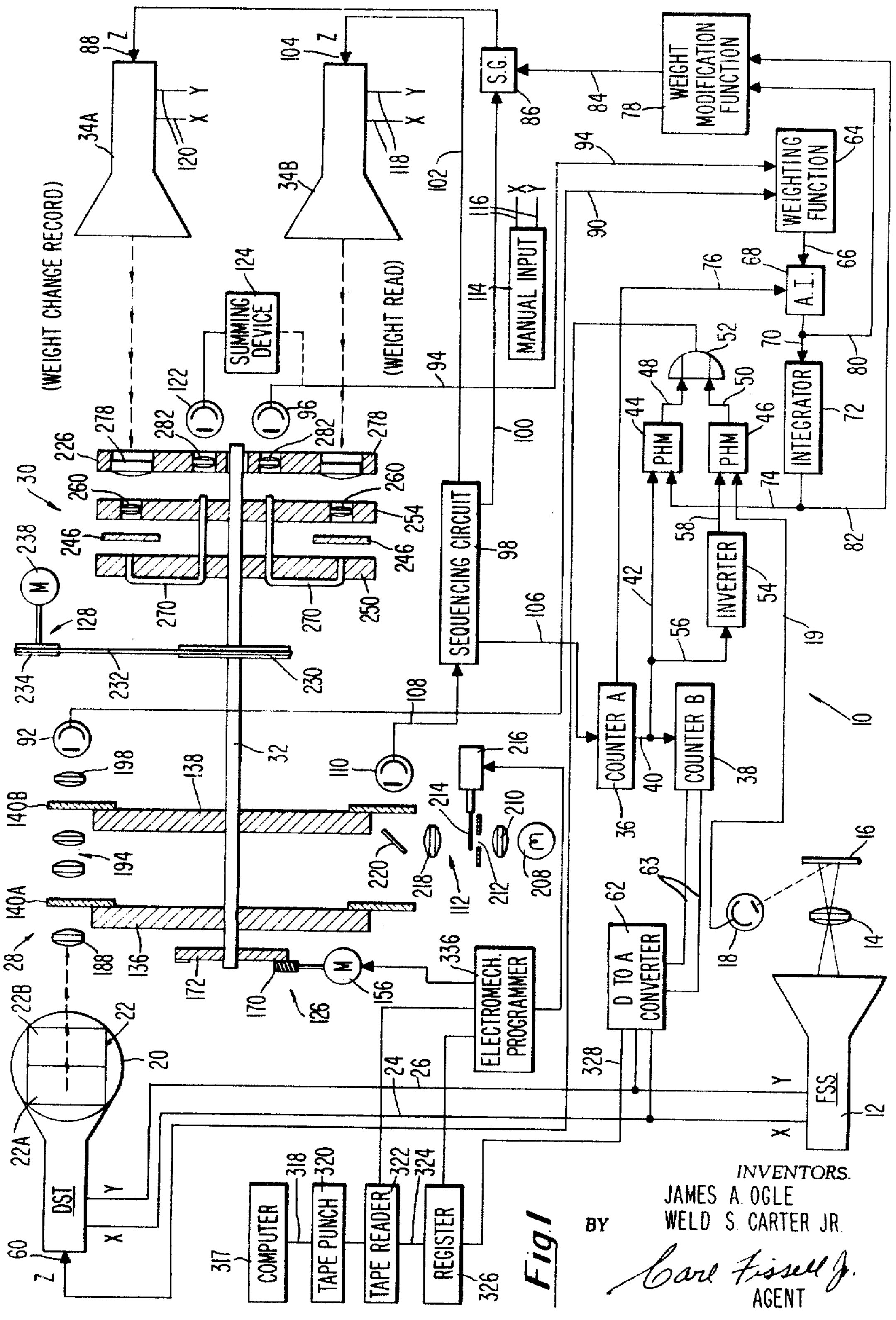
FIGURE 1 is an idealized and diagrammatic, schematic flow diagram of a preferred embodiment of the present invention.

A preferred embodiment of apparatus incorporating the present invention is shown in FIGURE 1 and will be first described hereinbelow in very general terms and thereafter in considerably more detail so as to provide a complete organizational description of both the associated apparatus and the direction of flow of information into and through the system. This apparatus while including new and novel features also includes a number of conventional and/or well known electronic and electro-mechanical techniques brought together in a novel combination to produce a new, novel and heretofore unknown result.

The simulation apparatus 10 of the present invention, as seen in the schematic flow diagram of FIGURE 1, includes among other things, a flying spot scanner (FSS) 12 and an associated lens system 14 for imaging light from the cathode ray tube onto an information object area 16 e.g. a book, map, solid figure, model, etc. A multiplier type photo tube 18 is associated with the object area in a manner such that the output from device 18 varies as a function of the reflectivity of the object 16 thereby providing one or more element inputs for purposes to be described hereinafter. A display storage tube (DST) 20, the display screen area or field 22 of which is or may be arbitrarily divided diagrammatically into two substantially similar portions 22A and 22B designated the element output field and input field, respectively, is also included in the apparatus.

The flexibility of the present invention is such that certain modes of operation can be accomplished wherein the part of the field 22 which is assigned for repeating essentially the signal from device 18 may for a part of the operational cycle be the whole field while for other parts of the cycle none of the field. If an experiment were simulated wherein there was some sensory input layer utilized, then all of the signals initially might come from 18. Another experiment may call for the information to be entirely internal and none of the signals are derived from 18, but are provided by other additional circuits which have not yet been described.

The X and Y axis deflection system of both the flying spot scanner and the information storage tube are or may be interconnected over the lines 24 and 26, in a manner hereinafter described, to provide the required operating potentials to deflect the beams of both tubes in a manner permitting information to flow in suitable directions relative to one or the other of these two devices.

Adjacent to the information storage tube 20 there is located an electro-mechanical-optical system hereinafter referred to as a distributor mechanism 28 operably coupled to an oscillographic mechanism 30. These two mechanisms operate conjointly by means of a common shaft 32 which extends therebetween and physically interconnects the one with the other for purposes to be described hereinafter. A plurality of cathode ray tubes, four in this embodiment (identified as 34A, 34B, 34C and 34D, only two of which are seen at the right in FIGURE 1) are disposed adjacent the oscillographic section and operate in a manner hereinafter described in detail to transmit signals supplied thereto from other associated equipment into and through the oscillographic section 30. Cathode ray tube 34A operates in a manner to be described hereinafter, to provide a weight change recording function of information in the oscillographic section of the apparatus. Cathode ray tube 34B, as will be described shortly, operates conjointly with a portion of the oscillographic section to provide a so called weight read function for the apparatus of the present invention. CRT 34B receives a signal from other associated circuits, still to be identified, which causes a standard brightening of the light spot on the tube screen. Information signals are imposed on this signal by the density of the weight plate as this light signal passes through it as will be described hereinafter.

A pair of counters 36 and 38 interconnected over lead 40, are connected via line 42 so as to feed an output signal to a pair of pulse height modulators 44 and 46, the output of each of which is fed over respective lines 48 and 50 to an "OR" gate 52. An inverter 54 interposed between counter output line 42 and pulse height modular 46 is connected thereto via lines 56 and 58. The output from the "OR" gate 52 is applied to the "Z" input 60 of storage tube 20 and effectively controls the brightness level of the electron beam of this CRT. A dual digital to analog converter 62 is interconnected to the X and Y axis deflection circuits of the flying spot scanner CRT and the storage tube 20. The output of counter 38 is connected to D to A converter 62 over lines 63.

The present invention also includes a weighting function apparatus 64 and an alternate inverter 68 interconnected over line 66. The output of alternate inverter 68 is fed over line 70 to integrator 72. Line 74 connects the integrator 72 output to pulse height modulator 44. Output line 76 connects an output of counter 36 to alternate inverter 68.

A weight modification function apparatus 78 is provided with an input line 80 from the alternate inverter 68 and an input 82 from integrator 72. The weight modification function output is fed over line 84 to a sampling gate 86, the output of which is utilized to provide the "Z" input 88 for weight change record CRT 34A of the oscillographic apparatus 30.

Weighting function apparatus 64 is provided with two inputs; one over line 90 from the photo-multiplier tube 92 associated with the information input section of distributor 28, and the other over line 94 from photomultiplier tube 96 associated with the weight record CRT 34B of oscillographic section 30 for purposes to be explained hereinafter.

Sequencing circuit 98 are provided for controlling the operational sequence of the various functions of the present apparatus. One output line 100 therefrom is provided from the sequencing circuits to sampling gate 86. Another output line 102 provides a potential to the "Z" input 104 of CRT 34B of the oscillographic section 30 for purposes still to be explained. A third output line 106 from the sequencing circuits 98 is fed as an input to counter 36. An input 108 from photo-multiplier tube 110 of the timing track generator 112 of distributor 28 is fed to the sequencing circuits 96 and acts to trigger the latter circuits in accordance with the position information derived therefrom.

The X and Y axis deflection apparatus for the CRT's 34A–34D includes a manual input device 114 for controlling the respective deflecting potentials over output lines 116 to respective pairs of input lines 118 and 120, as will be described more fully hereinafter. The manual input 114 permits the electron beam to be positioned at will in accordance with a desired input program. Photo-multiplier tube 122 is utilized in conjunction with a summing apparatus 124 for purposes to be described herein presently.

Independent drive means 126 and 128 is provided for shaft 32 for actuating the distributor 28 and the oscillographic section 30, respectively. Each drive means includes one or more timing cams and associated switches identified hereinafter for timing the desired or programmed operation of that portion of the apparatus.

DISTRIBUTOR MECHANISM

Figure 2:
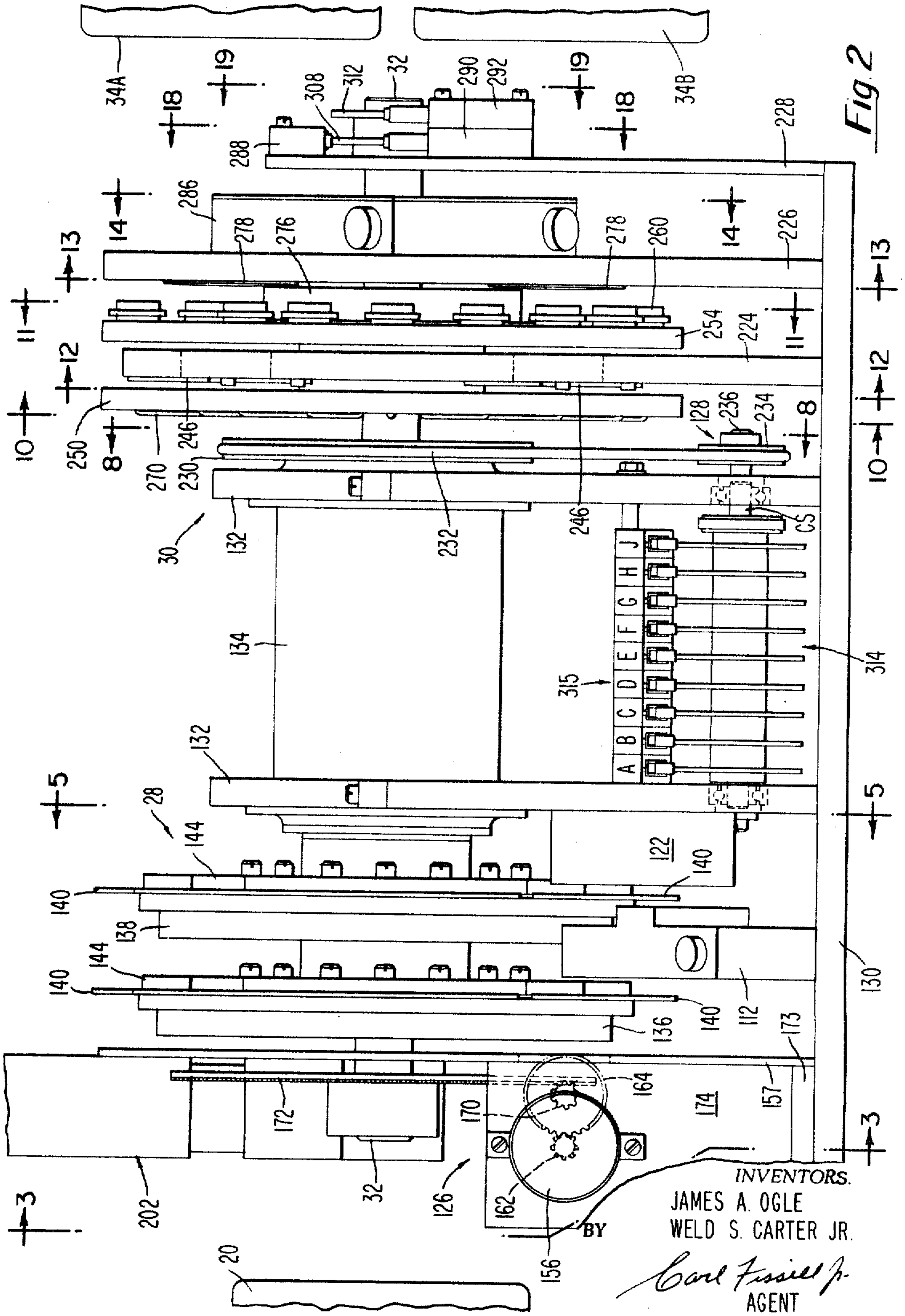
FIGURE 2 is a side elevational view of the electromechanical portion of the apparatus of FIGURE 1.

The distributor 28 is, as seen in FIGURE 2, one operating unit of a relatively complex multi-unit assembly which includes a base 130 and a pair of centrally disposed spaced apart vertically extending bulk heads 132 through which the horizontal, elongated drive shaft 32 is operably disposed and suitably journalled. Shaft 32 is thus freely, rotatably, movable throughout its length within a protective housing 134.

Figure 5:
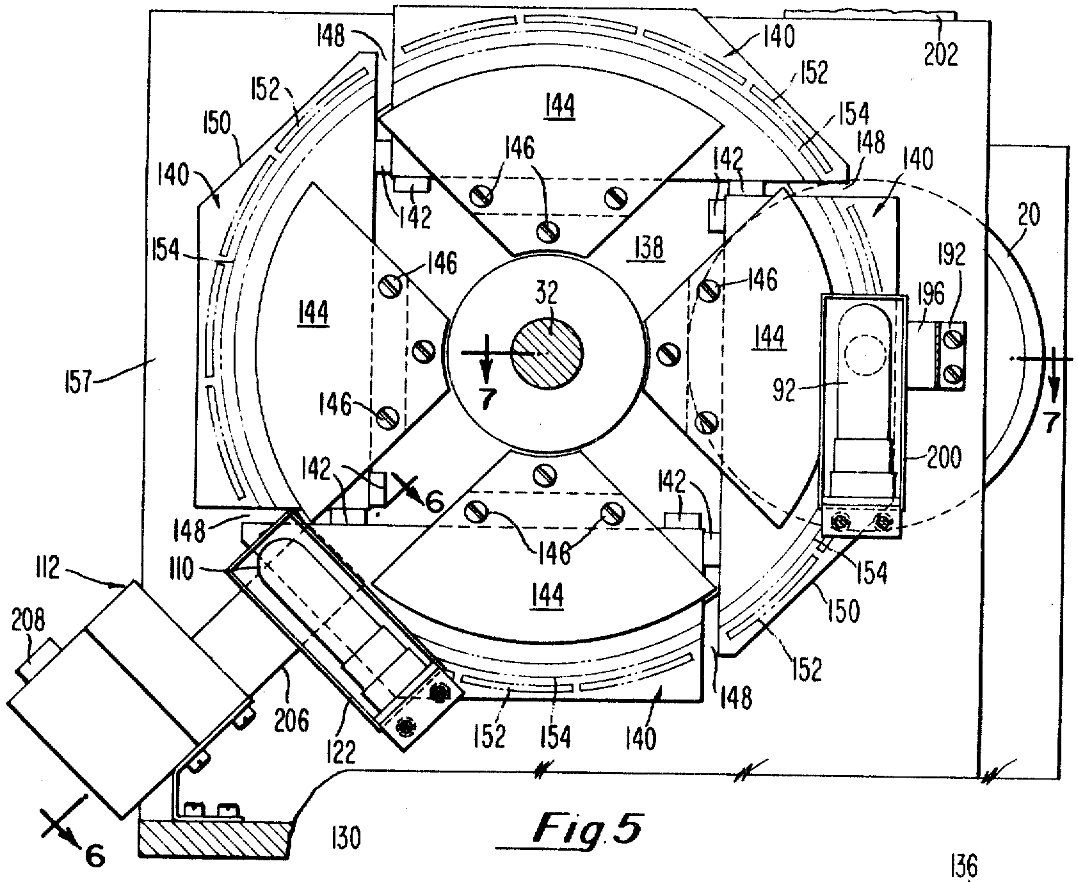
FIGURE 5 is a view taken along the line 5—5 of FIGURE 2 illustrating the distributor wheels and photo-plates used with the invention.

Distributor mechanism 28 is seen to comprise e.g. two rotatable relatively rigid discs or wheels 136 and 138, e.g. of aluminum secured to and movable with shaft 32. Emulsion bearing photo-plates 140 or relatively rigid photographic film e.g. four per wheel, are located quadrantly around the periphery of each wheel on sets of locating blocks 142 as shown in FIGURE 5, three per plate in this embodiment. Pie shaped members 144 adjustable by means of screws 146 permit each of the plates 140 to be demountably secured on its respective quadrant of the associated wheel, thereby enabling each plate 140 to fit close against the flat wheel surface and yet be removable therefrom and so that the four plates together enclose or define a circular area around the wheel with only slight interruptions or gaps 148 between plates. The exact shape of the plates is of minor significance. However, in order to permit the wheel to rotate interference free, the edge 150 of each of the plates 140 has been cut away at a slight angle thereby providing an efficient compact and semi-continuous plate surface permitting high information packing density thereon. Each plate 140 carries a timing track area 152 and an information signal track area 154 as will be described more particularly hereinafter.

Incremental drive means 126 includes e.g. a servo type driving motor 156, FIGS, 2, 3, and 4 disposed adjacent a vertical plate or wall member 157. Motor drive shaft 158 carries a multi-lobed cam 160 and a small gear 162 adapted to be in mesh with the teeth of larger gear 164, the periphery of which extends through clearance opening 165 in wall 157. Gear 164 is carried by shaft 166, the other end of which carries a worm gear 170 engageable with the teeth of the large driven gear 172 secured to main drive shaft 32 for driving the same when motor 156 is energized. The drive assembly is mounted on a plate 173 by means of supports 174. Plate 173 is slidable right or left FIG. 3 via slots 175 a sufficient distance to engage worm gear 170 with the large gear 172, as desired. A momentary contact switch 176, FIG. 4 having an operate arm 178 carrying a follower roller 180 engageable with the lobes of cam 160 is adapted to be opened and closed as cam 160 is rotated. This switch in conjunction with the switch actuated by cam 314A to be described later on herein enables the apparatus to be indexed the desired number of times or points as will be described hereinafter.

An index pointer 182 disposed adjacent the drive wheel 172 cooperates with index marks 184 effectively identifying the specific wheel quadrant in use and in conjunction with operator observation of cam 160 enables positioning of the apparatus to a zero or "start" point.

Figure 7:
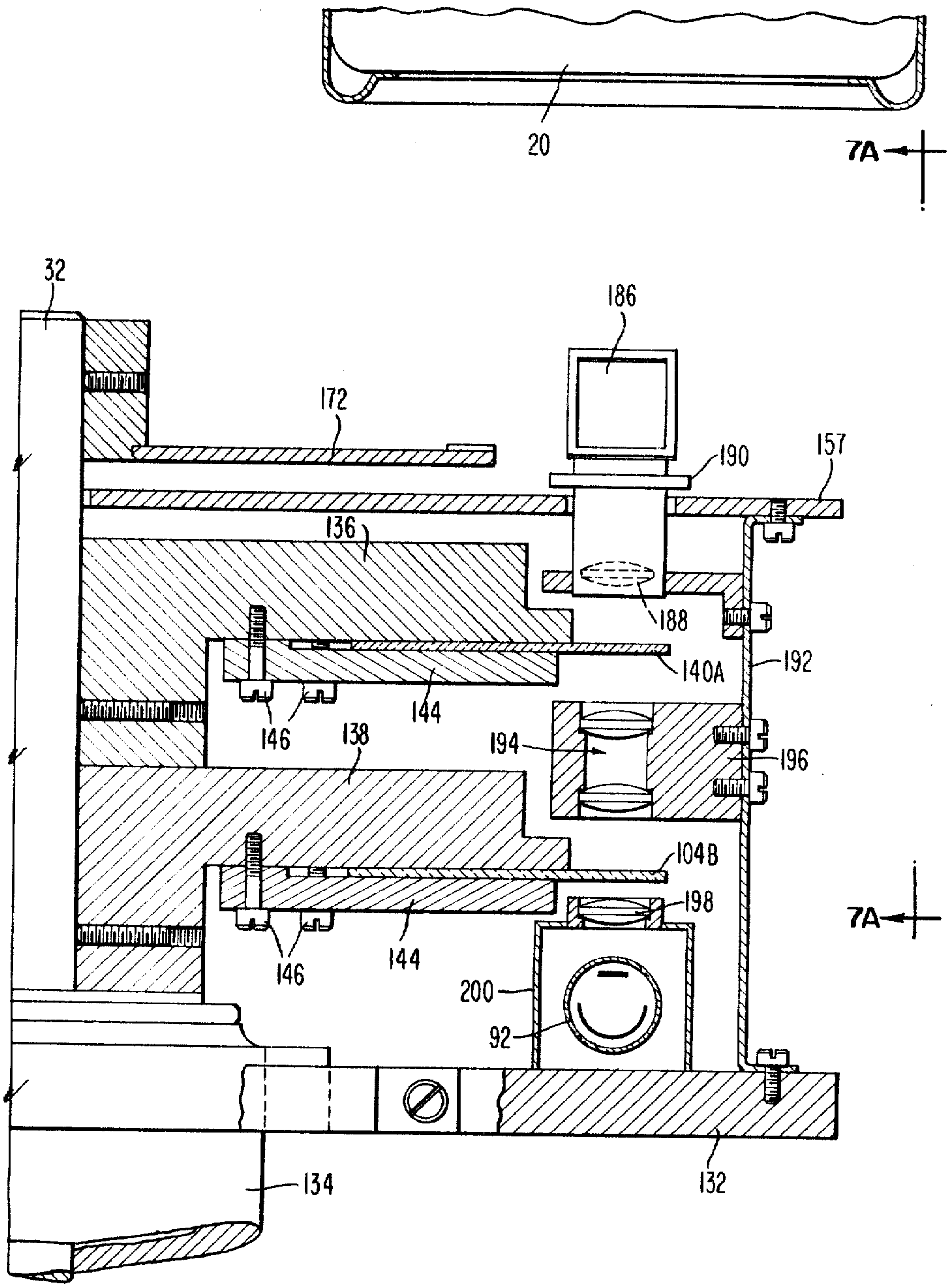
FIGURE 7 is a view taken along the line 7—7 of FIGURE 5.
Figure 7A:
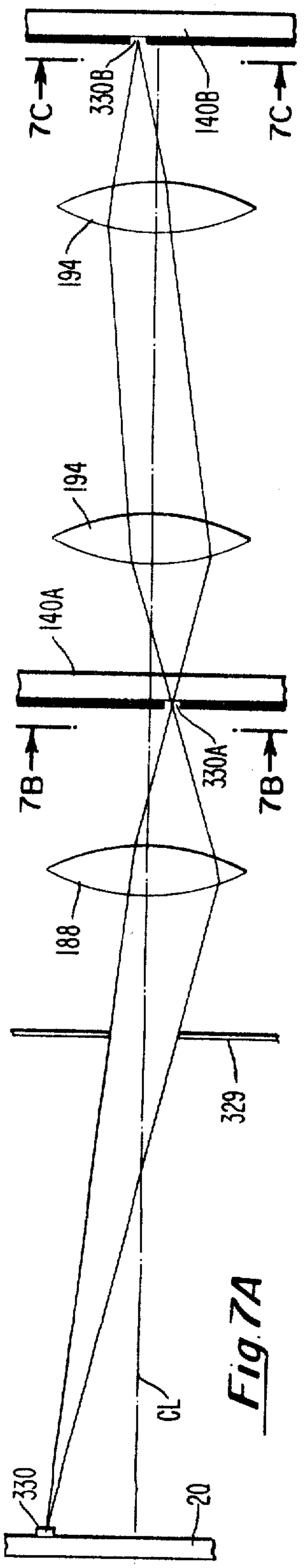
FIGURE 7A is an idealized diagrammatic view taken along the line 7A—7A of FIGURE 7.

Associated with wheels 136 and 138 and plates 140A and 140B carried thereby is the optical system shown diagrammatically in FIGURE 1 for directing signal information e.g. light, from a source e.g. tube 20 to the photo-multiplier 92 and includes, as seen in FIGURE 7, a beam splitter 186 and an objective lens 188 disposed and supported in a housing 190 secured as by bolts to a light tight enclosure 192 which images the input field of the storage tube 20 onto the first set of plates 140A so that the light image or spot from the storage tube can be focused onto the emulsion (not shown) on the plate.

A compound relay lens 194 is disposed in a housing 196 between the first set of plates 140A and the second set of plates 140B for imaging the light from the first plates onto the second set of plates. The optics of the system provides a one to one magnification although this is not critical but is simply a matter of design choice. Behind the second set of plates there is disposed a condensing lens 198 which focuses the output from the second set of plates 140B onto photo-multiplier tube 92 secured in light tight housing 200 on the frame of the apparatus. As before mentioned, tube 92 is connected over line 90 to the weighting fuction apparatus 64 of the electronic circuitry associated with the present invention.

Figure 3:
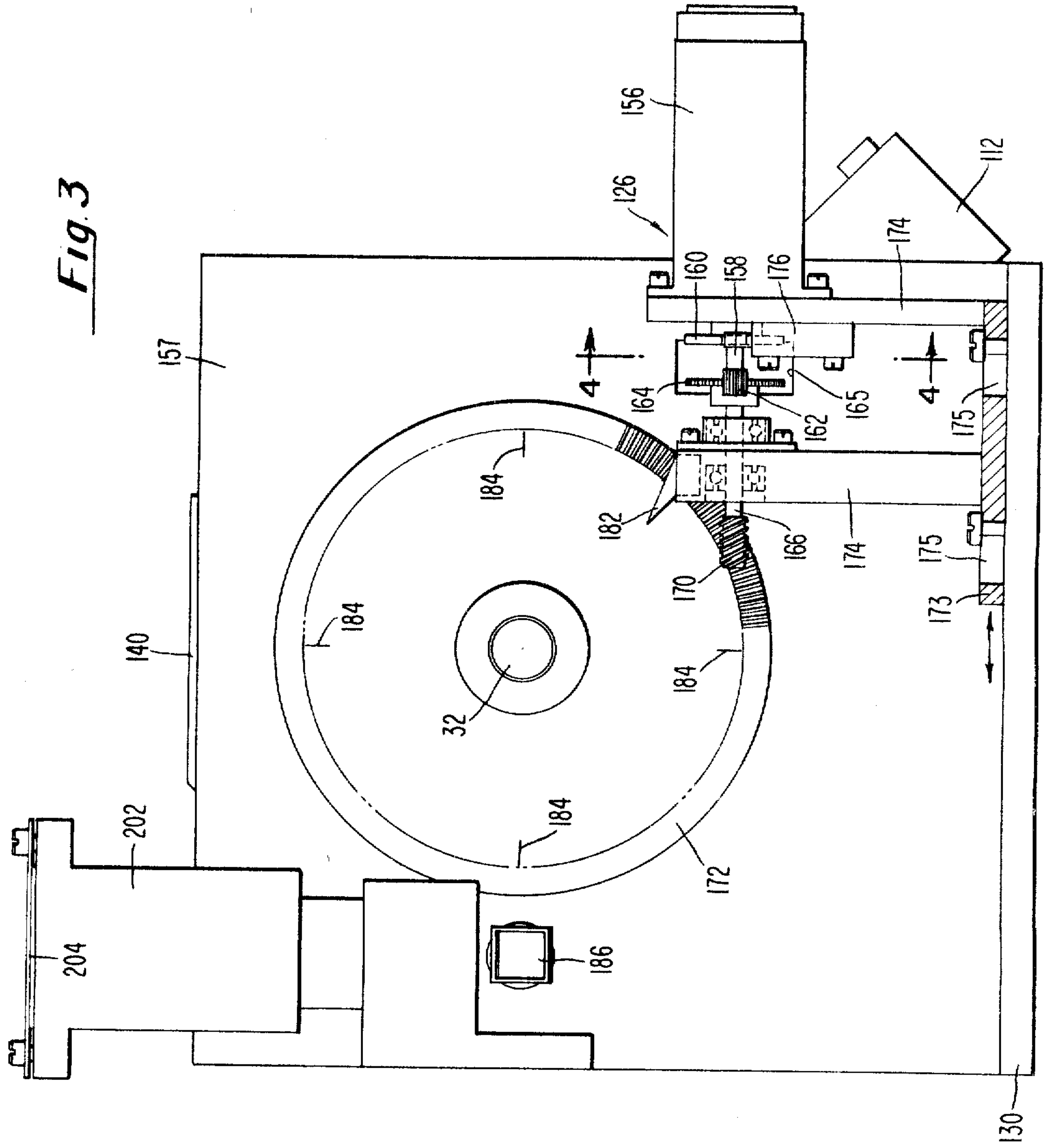
FIGURE 3 is a view taken along the line 3—3 of FIGURE 2 illustrating one of the drive mechanisms for the present invention.
Figure 4:
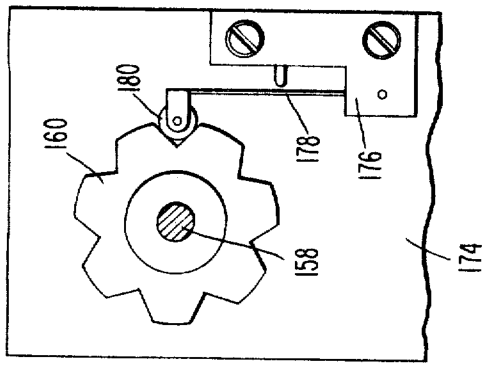
FIGURE 4 is a view taken along the line 4—4 of FIGURE 3.

A relatively high power magnification optical monitoring system 202 FIGURE 3 located adjacent drive wheel 172 also includes the beam splitter 186 and a display screen 204 which likewise receives its input from tube 20. In this manner, the display of tube 20 can be viewed during operation of the apparatus so that focus etc. adjustments of CRT 20 can be made easily and efficiently.

Figure 6:
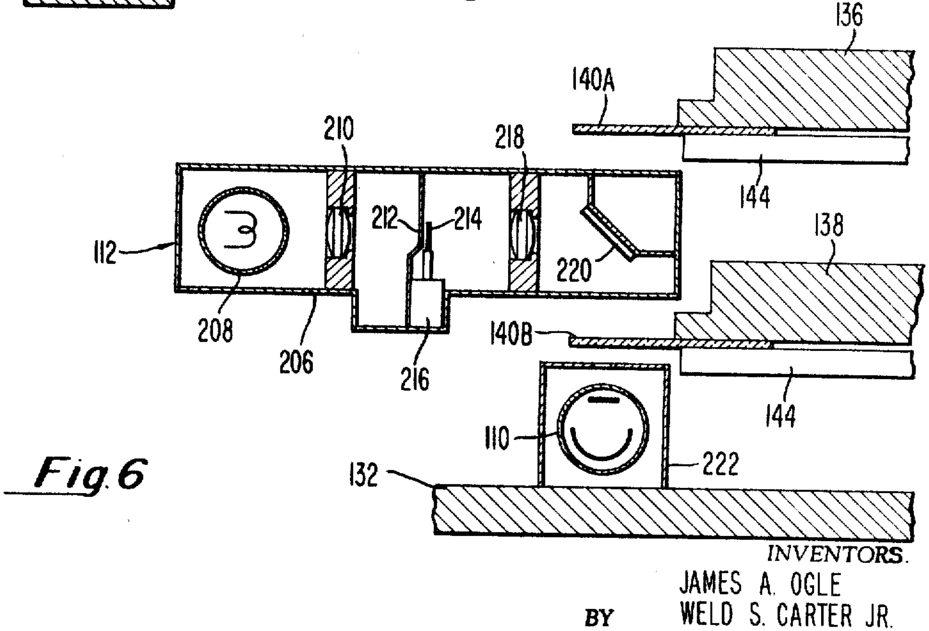
FIGURE 6 is a view taken along the line 6—6 of FIGURE 5.

Timing track generating means 112, FIGURES 5 and 6, enclosed by a shroud or cover 206 both produces and monitors the timing or registration track 152, FIGURE 5 and includes a shutter 214 actuated by a solenoid 216, a second lens 218, a mirror 220 and photo-multiplier tube 110.

As seen in FIGURE 6, the exciter lenses and mirror are arranged on the left side of plates 140B so that light is projected through the track in each plate to impinge upon the photo-cathode of the tube 110 which is mounted in a housing 222 on the opposite side of plates 140B. Thus the light must pass through the track to energize the photo tube. The output of tube 110, as before mentioned, is connected over line 108 to sequencing circuits 98 as will be explained hereinafter.

The storage tube is provided with a substantial array of points, which are displayed in the manner of a neuron input field. The function of the distributor, in brief, is to select, for any given angular position of the shaft 32, a unique point or unique small set of points out of the input field of the storage tube 20 which keeps changing as the shaft rotates. This operation is repeated for each revolution of the shaft 32 of the machine. The manner of this operation of the distributor will be described more fully hereinafter.

OSCILLOGRAPHIC MECHANISM

The oscillographic section 30 of the present apparatus, which permits recording photographically in variable density, as will be hereinafter described, is seen in FIGURE 2 to include three relatively rigid bulkheads 224, 226, and 228 secured in a known manner to base 130, as by bolts, and through which shaft 32 extends and is journalled in a convenient fashion. A driven pulley wheel 230 is secured to shaft 32 and carries a driving pulley belt 232 operably engageable with a small pulley wheel 234 rotated by shaft 236 of drive motor 238. The latter drive arrangement is employed to rotate shaft 32 when the distributor drive means 126 is disengaged or otherwise not in use.

Figure 12:
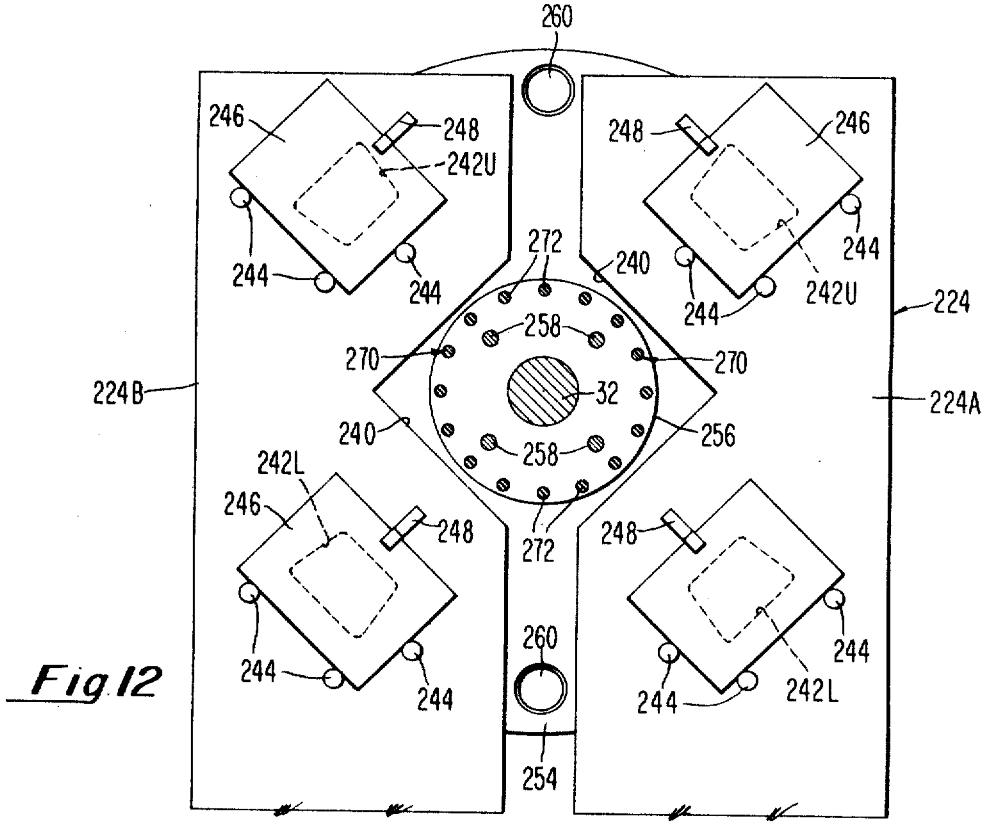
FIGURE 12 is a view taken along the line 12—12 of FIGURE 2 illustrating the weight plate structure for the oscillographic portion of the present apparatus.

Bulkhead 224, FIGURES 2, 12 and 15 (particularly FIGURE 12) comprises two separate though substantially similar right and left hand portions 224A and 224B respectively, each of which is provided with a substantially, central V-shaped notch or clearance cut out 240 and two oppositely disposed upper and lower trapezoidal shaped apertures 242U and 242L arranged on a radius at a suitable distance from shaft 32 as hereinafter described. Adjacent each aperture 242 are a plurality of projections or pins 244 forming banking pads, located in a manner such that a glass or film photo-emulsion bearing slide member 246 may be disposed thereon adjacent each aperture 242 in relatively stiff registration therewith. A flexible, spring type retaining clip 248 is provided for each slide 246, so as to prevent accidental removal or dislodgement thereof.

Figure 15:
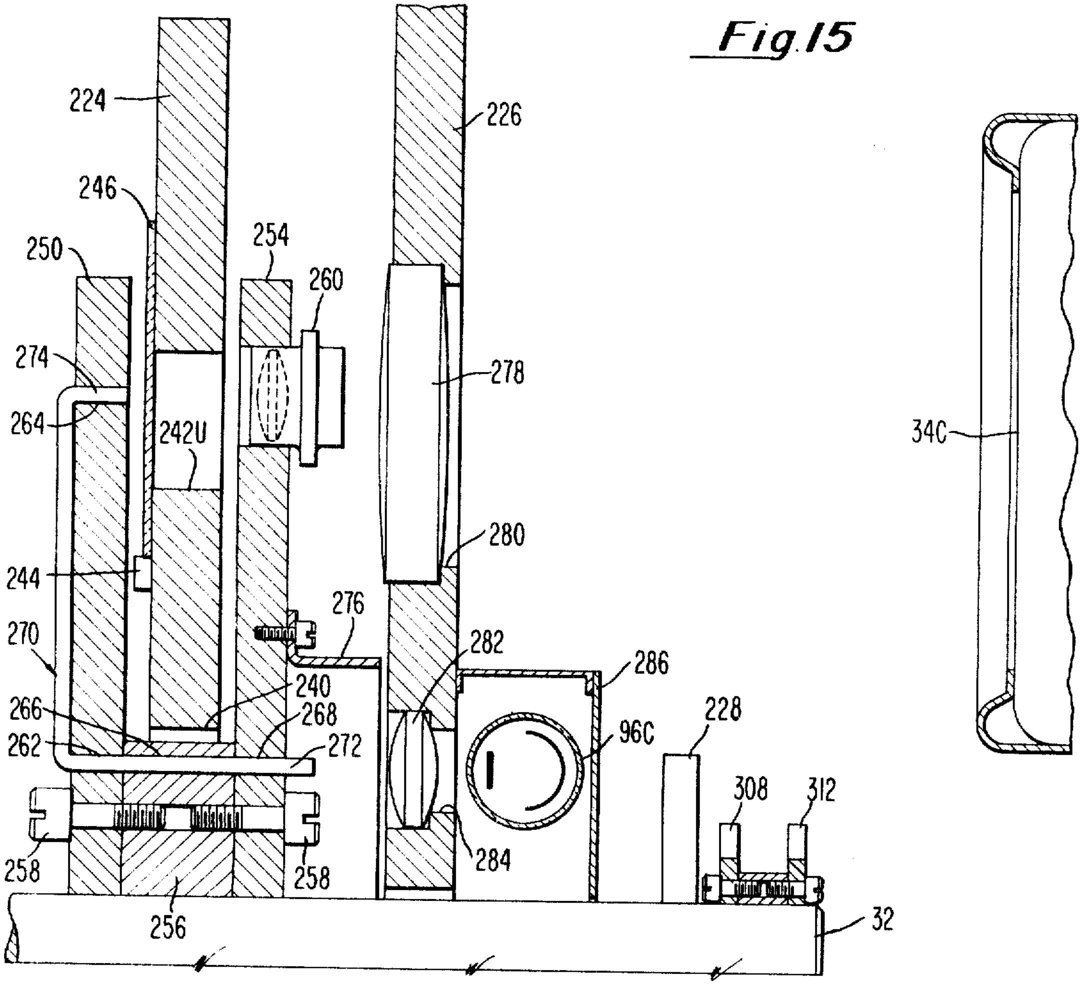
FIGURE 15 is a view taken along the line 15—15 of FIGURE 14.

Disposed on opposite sides of split bulkhead 224 are two rigid discs or wheels 250 and 254, FIGURE 15, e.g. aluminum which are mounted together as a unitary assembly on shaft 32 by means of an enlarged hub 256 to which the two wheels are attached as by bolts 258.

Figure 11:
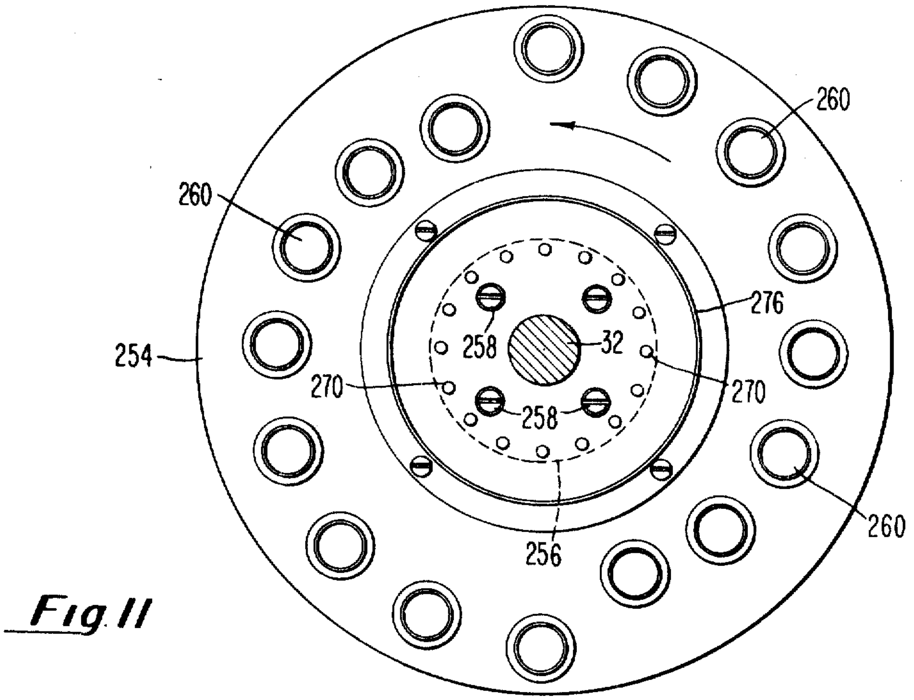
FIGURE 11 is a view taken along the line 11—11 of FIGURE 2 illustrating the multi-lens wheel of the oscillographic portion of the present invention.
Figure 10:
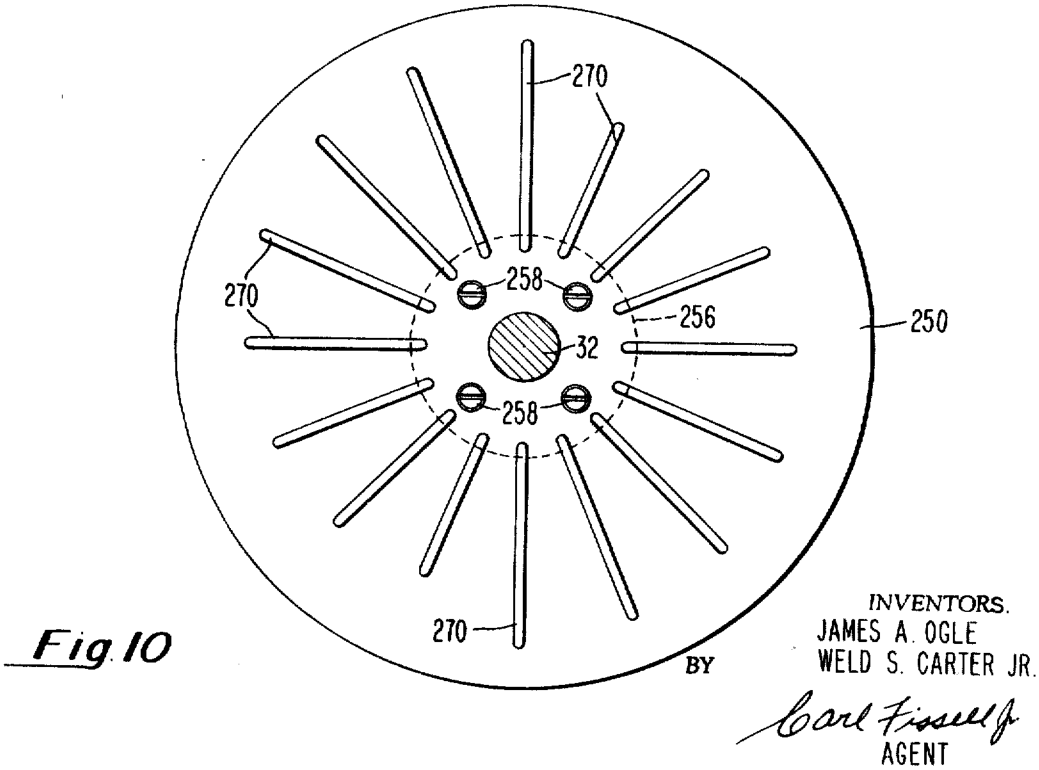
FIGURE 10 is a view taken along the line 10—10 of FIGURE 2 illustrating the light pipe wheel of the oscillographic section of the invention.

Circularly disposed at a changing radius around the outer periphery of wheel 254 are two sets of eight objective lenses 260, FIGURE 11. These lenses are arranged in two substantially interlaced helices, on radii corresponding to the radius of the trapezoidal apertures 242 in bulkhead 224.

Wheel 250 is provided with two concentric sets of inner and outer peripheral apertures 262 and 264, respectively. The hub 256 is likewise provided with a set of apertures 266 as is the inner periphery of wheel 254, the latter being identified at 268.

Irregularly shaped, light conducting pipe-like members 270 have their outer and iner ends 274 and 272 respectively disposed through apertures 264, and apertures 262, 266, and 268 respectively. The outer end 264 of each light pipe or rod 270 is arranged in substantially axial alignment with a lens 260 while the inner end of each vent light pipe 270 extends, slightly, horizontally away from the surface of wheel 254 (rightwardly) for purposes to be described later on herein. A partial shroud or light tight enclosure 276 surrounds the inner ends 272 of the light pipes as seen in FIGURES 11 and 15.

Figure 16:
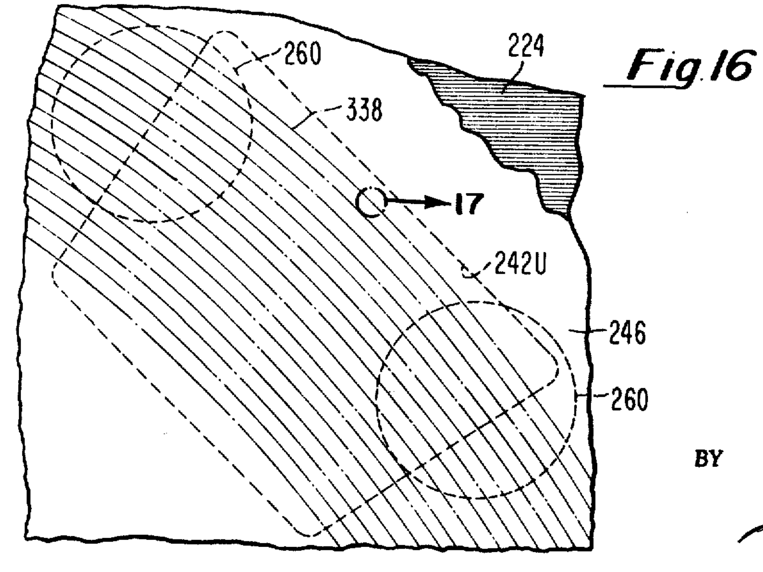
FIGURE 16 is a greatly enlarged view of the track portion of a weighting plate of the oscillographic section of the present apparatus.

Bulkhead 226 is utilized as a support means for a plurality of collimating lenses 278 located in recessed apertures 280 therein and arranged to collimate the light from respective ones of the four CRT's 34A through 34D, as will be explained shortly. Closely adjacent the shaft 32, i.e. on a relatively small radius are located four condensing lens 282, also in recessed apertures 284, in member 226 for imaging light from light pipes 270 onto respective ones of the four photo-multiplier tubes 96A through 96D located within a light tight housing 286 on the opposite side of bulkhead 226 in optical alignment with lenses 282. By means of the foregoing apparatus, a point of light from the CRT's 34A through D is imaged upon photo-plates 246 by lenses 278 and 260 for each revolution of the shaft 32 so that the image of the point of light will make 16 nearly contiguous consecutive sweeps on each photo-plate. Each of the sweeps will be at a different radius as seen in FIGURE 16.

Figures 18, 19:
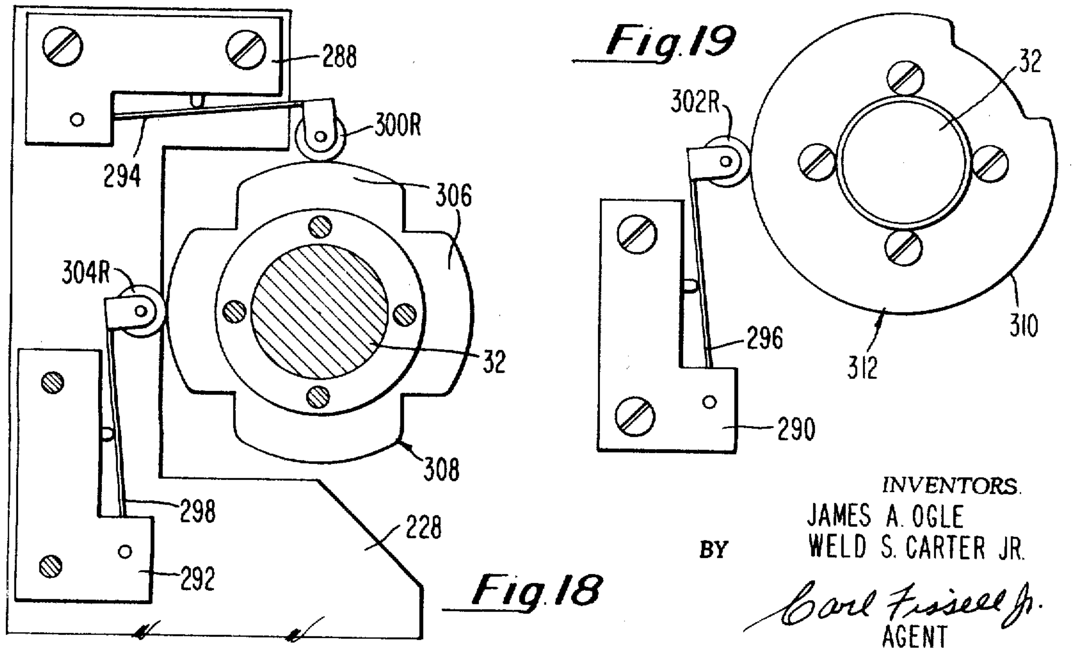
FIGURE 18 is a view taken along the line 18—18 of FIGURE 2.
FIGURE 19 is a view taken along the line 19—19 of FIGURE 2.

Adjacent the outboard end of shaft 32 (rightwardly) on bulkhead 228 in front of the CRT's 34A through D are located three control micro-switches 288, 290, and 292, FIGURES 18 and 19. The actuating arms 294, 296, and 298, respectively of the micro-switches carry follower rollers 300, 302, and 304. Rollers 300 and 304 are engageable with lobes 306 of operate cam 308 while roller 302 engages lobe 310 of operate cam 312. Cam 308 and 312 are disposed in spaced apart parallel arrangement and are pinned to and rotatably driven by shaft 32 for purposes to be described herein presently.

Figure 8:
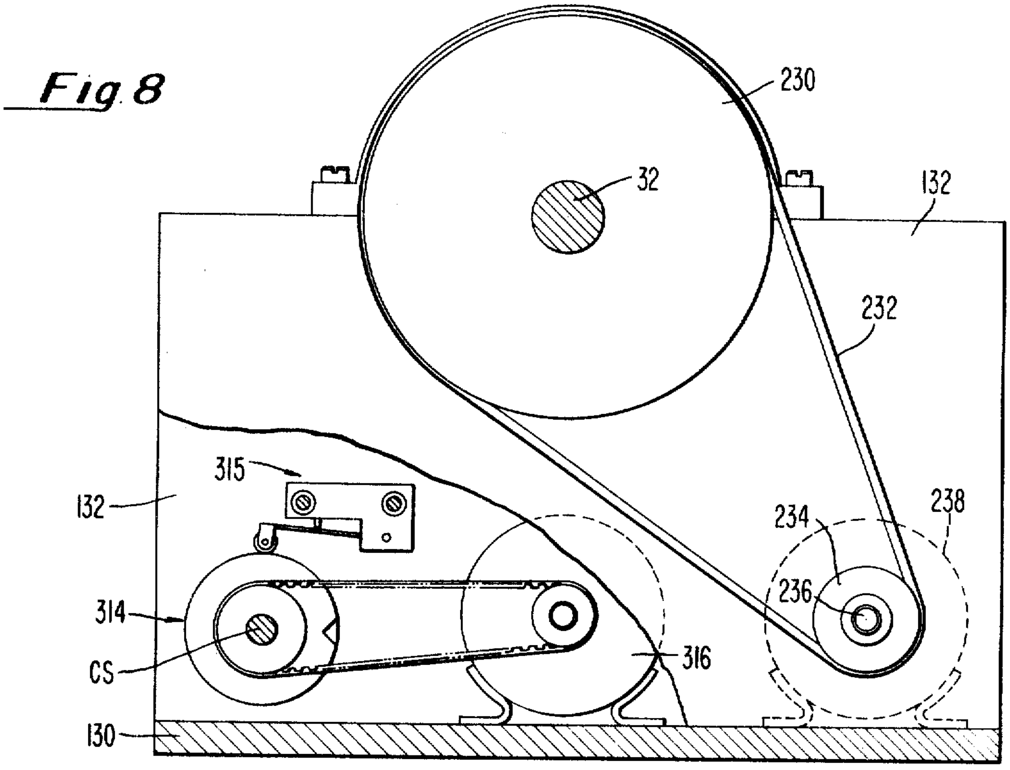
FIGURE 8 is a view taken along the line 8—8 of FIGURE 2 illustrating the secondary drive apparatus for the invention.
Figure 9:
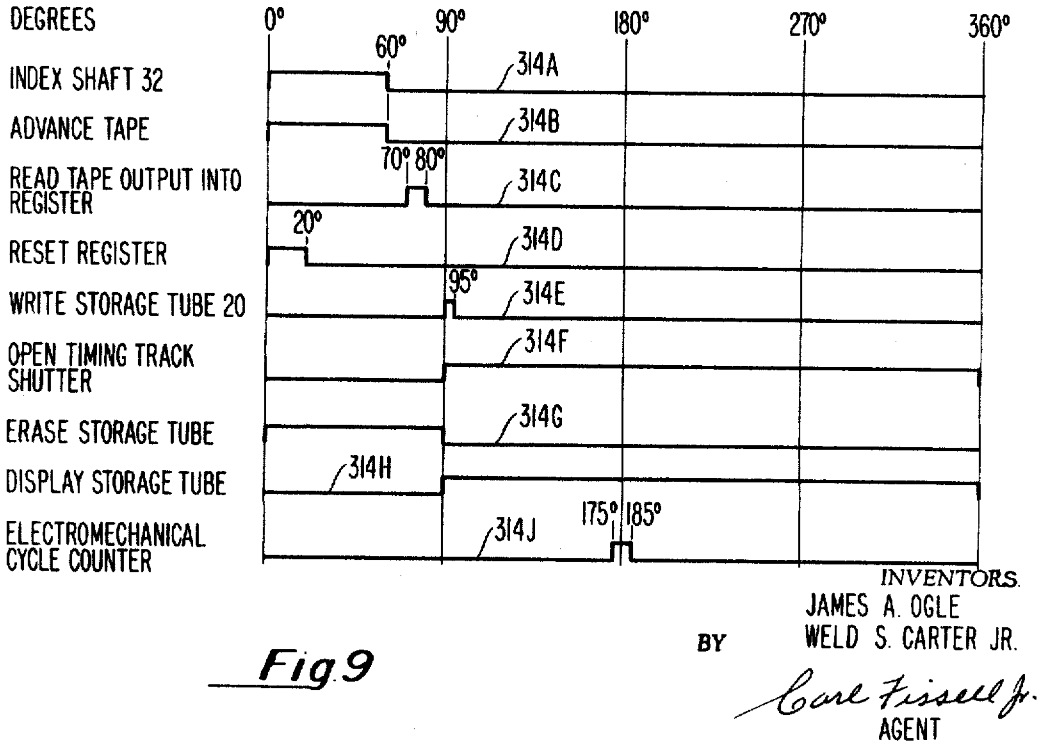
FIGURE 9 is a timing diagram for the distributor write mode of the apparatus of FIGURE 1.

Intermediate the upright pedestals 132—132 on base member 130 is disposed a bank of timing cams 314 and switches 315. FIGURES 2 and 8 which provide the machine operating functions as described by means of the captions to the left of the timing diagram, FIGURE 9. The individual cams are identified as 314A through 314J inclusive, while the switches are identified as 315A through 315J inclusive. The cams and switches are driven by means of a separate motor 316 and pulley belt as seen in FIGURE 8.

In its preferred embodiment, the present invention can be considered to act in the manner or nature of a distributed network processor and can be characterized by defining each of these terms as set forth hereinafter. A network, as used herein, refers to a complex set of paths and transfer elements in which signals, for example, electrical potentials, levels or pulses propagate. Examples of networks in accordance with the definition above might, for example, be a maze of "AND" gates and "OR" gates. Such networks are useful in cognitive operations, for example, the recognition of intelligible characters; the identification of specified elements in a pattern; the identification of objects in aerial photography; the recognition of a class of operations as determined by persons, equations and the determination of what these equations constitute. In other words, given some function which does not for the moment bear an identifying label thereon, the device recognizes into what class or classes it falls for purposes of actuating a compiler to program a computer. Such operations as these avoid the present day requirement of programming a computer in strict, explicit and restricted language, and permit the utilization of more general and broadly defined language.

In the perceptron class of apparatus, all of the parts of the network are in being in the machine at the time the desired experiment is in process. For example, printed circuit cards are used which perform a transfer function. These cards are sometimes referred to as neurons or neuron-like transfer elements (basically they are small sub-sections in the network each of which has a plurality of input terminals and an output terminal). Generally the inputs are weighted and integrated in some manner, and the outputs occur or do not occur or occur at some level or frequency as a function of the state of all the inputs to the individual elements.

In direct contrast to this, the present invention contemplates a distributed arrangement wherein only one element or a relatively small number of elements are constructed and wherein this element or elements can be caused to occupy consecutively, in the course of one cycle of the operation of the machine the position of or perform the role of a large number of individual elements. In the course of the cycle of operation of the machine, the group of circuits which constitute the element, receives inputs through the distributor section of the machine, receives weights synchronously with these inputs from the weight store in the oscillographic section of the machine and as a function of this combination performs a rapid integration, delivering an output which is returned to a storage field where such output is available as an input for any other neuron or any other element.

DISTRIBUTOR WRITE MODE

One example of an experiment demonstrating the novel construction, operation and usefulness of the present embodiment of the invention is shown in the various figures of the drawings and employs a so called haphazard, nonprearranged or random number program. This program may be implemented by means of a general purpose (digital) computer 317. It is noted that any ground rules which the experimentor or operator may wish to apply may be utilized in the generation of this set of connectivity data. For example, restrictions may be placed upon the statistical distribution of the connectivity paths or provision for specific connectivity patterns. The thus generated information may be neither totally haphazard nor totally prearranged but may involve a connectivity pattern in which there is a higher frequency of short connections relative to long connections.

It is assumed for the sake of clarity of description that the "start operation" is initiated with the various elements of the combination at the rest, start or zero index position. Thus, the cam shaft CS, FIGURE 8 is at a zero index as is the main drive shaft 32, FIGURE 9. The registers, counters, etc. have likewise been reset to a zero or start index position as has the tape reader. Information output from computer 317 is fed over line 318 into a tape punch 320, which produces a perforated tape (not shown) in conventional fashion. Cam 314A (switch 315A) causes the main drive 126 to index shaft 32 to its start position. The tape prepared by the punch 320 is placed in the tape reader 322 and advanced to a start position by means of cam 314B (switch 315B). At 70°–80° the tape is read out, initiated by cam 314C (switch 315C). Information from the tape reader is fed over the line 324 to a read-out register 326 reset by means of cam 314D (switch 315D). In lieu of read-out register 326, counter B can be switched or rewired so as effectively to act in the nature of a read-out device instead of a counter.

The output from register 326 is fed over line 328 to digital to analog converter 62. The latter device, as earlier mentioned herein, is used to control the X and Y positions of the cathode ray beam of storage tube 20. In this manner, when the CRT beam is caused to "write a spot of light" in response to cam actuation, 314E the spot will occur at various positions on screen 22 corresponding to the position information recovered from the punched tape. Upon actuation of cam 314H (switch 315H), high voltage from a source (not shown) is applied to the screen of the display tube 20.

Referring now to FIGURES 7A–7D inclusive, it is seen that the light output thus generated is directed through the lens system of distributor 28 via the telecentric stop member 329 to the virgin i.e. unexposed photo-plates 140A and 140B, respectively. This initiates an exposure of the image of the luminous spot or point 330 as indicated at 330A and 330B within the storage tube field 22. The images 332A–332B of the storage tube field occupies an area approximately ⅛ inch radially and ¹⁄₁₆ inch tangentially, FIGURES 7B and 7C at an aspect ratio of approximately two to one (2/1).

At the end of the exposure time which may be approximately ¾ of a second (the time limitation is a function of the resolution and contrast requirement and is not critical) the high voltage is removed from the display screen of the display storage tube. The tape reader is instructed to advance by cam 314B and the indexing mechanism by cam 314A causing the distributor mechanism to be advanced approximately 3 thousandths of an inch i.e. one tooth of the large toothed wheel 172, FIGURE 3, ¹⁄₁₀,₀₀₀ of a revolution.

The "written" spot of the display storage tube is now erased by conventional electronic circuit means controlled by cam 314B and the register-counter B is then reset to zero by 314D. At some predetermined time during the foregoing exposure cycle an electro-mechanical counter (not shown) is advanced by action of cam 314J so as to provide a means for monitoring the number of exposures that are placed on any one plate.

The operation hereinabove set forth is continued for each of the four plates 140A on wheel 136 until the capacity of the plates is attained. Thereafter, the four plates are processed by conventional, reversal, photographic processing techniques resulting in the transparent, light transmitting spot, point or apertures 330A. Depending upon the parameters employed in the above operations such apertures may vary in size from approximately .001 to .002 of an inch in diameter. The spacing distribution of these apertures may also vary from approximately .00175 to .00350 of an inch. The latter is a function of the desired total amount of information which the programmer or experimentor may call for in the machine.

At the end of the write operation for the distributor plates 140A, the punched paper tape in the tape reader is rewound. Dummy or blank glass plates or the original (now processed) plates 140A are now placed on wheel 136. A second set of virgin, emulsion bearing, distributor plates 140B is placed on wheel 138. The distributor plate writing process identical to that used to generate plates 140A is now repeated for each of the four new plates 140B i.e. the image formed in stage A is relayed via the lenses 194 onto the plates 140B in stage B. Due to the optics involved, this image is inverted at 140B, right in FIGURE 7A and thus although the two wheels 136 and 138 are mounted on the same shaft 32 and actually rotate in the same direction, due to this optical inversion the direction of motion relative to the image in stage B is opposite to that relative to the image in stage A.

Figure 7D:
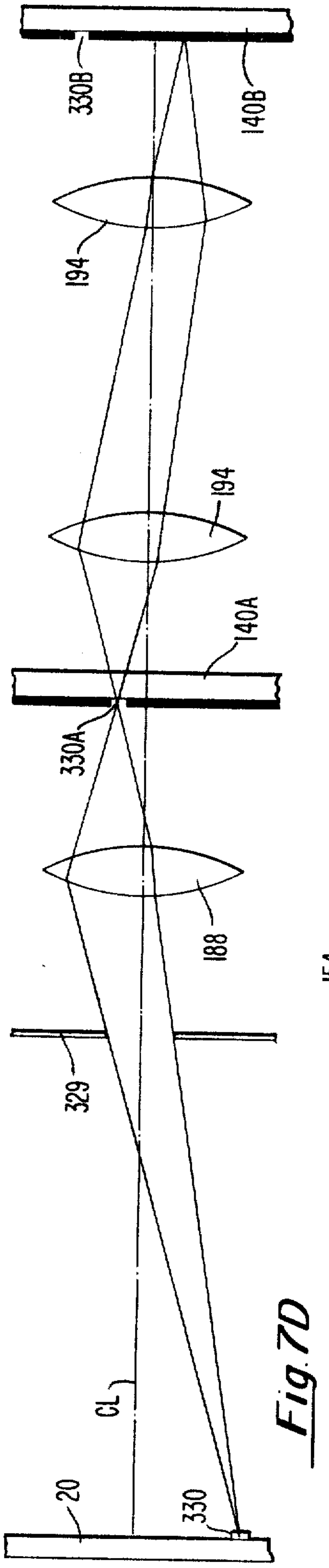
FIGURE 7D is a view taken along the line 7D—7D of FIGURE 7A.
Figure 7C:
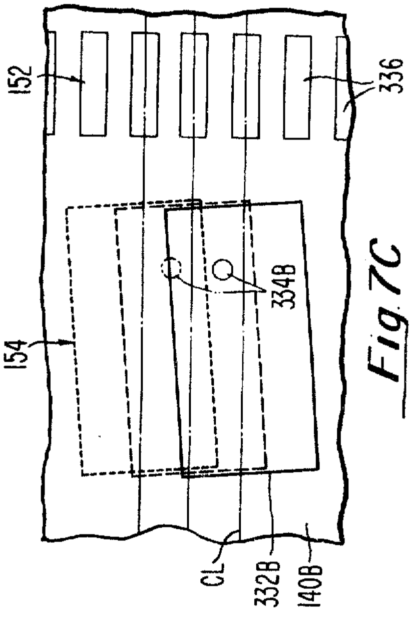
FIGURE 7C is a view taken along the line 7C—7C of FIGURE 7A.
Figure 7B:
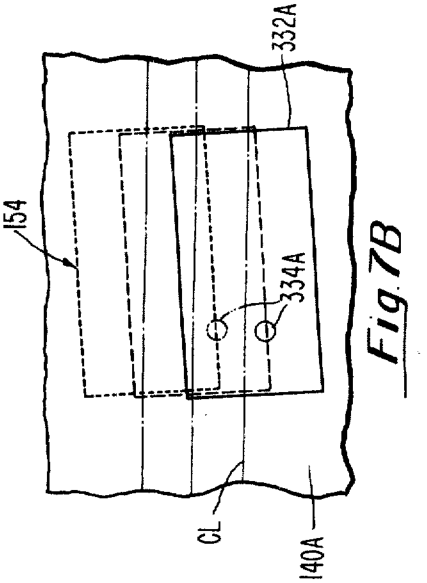
FIGURE 7B is a view taken along the line 7B—7B of FIGURE 7A.

Concurrently, with the foregoing writing operation of plates 140B, shutter 214 of timing track generator 112 is actuated by cam 314F imaging the slit 212 by means of the light source 208 and lenses 210 and 218 thereby exposing the timing track 152, FIGURE 5 corresponding to the index positions of the exposures on the virgin plates 140B and 140A as indicated. Plates 140B are now processed as were plates 140A. It should be noted at this point, as will be apparent when the description of the information-recovery-utilization operations are set forth hereinafter, since only one spot or point has been printed for any given angular index position of the shaft 32 (and wheels 136 and 138) only one spot on plate 140A registers with a spot on plate 140B as seen in FIGURES 7B and 7C. Thereafter the processed distributor plates 140A and 140B are returned to their registered mounting positions. As seen in FIGURE 7D, one index of shaft 32 later, some other point in the display storage tube field will be accepted by the aperture 330A, but since aperture 330B has also been displaced to a new position, the light transmitted by aperture 330 does not reach it. Thus, only one set of apertures is in register for each index position of shaft 32. During this so called "write" operation, the other electronic functions of the apparatus are inactive.

OSCILLOGRAPHIC WRITE MODE

Figure 13:
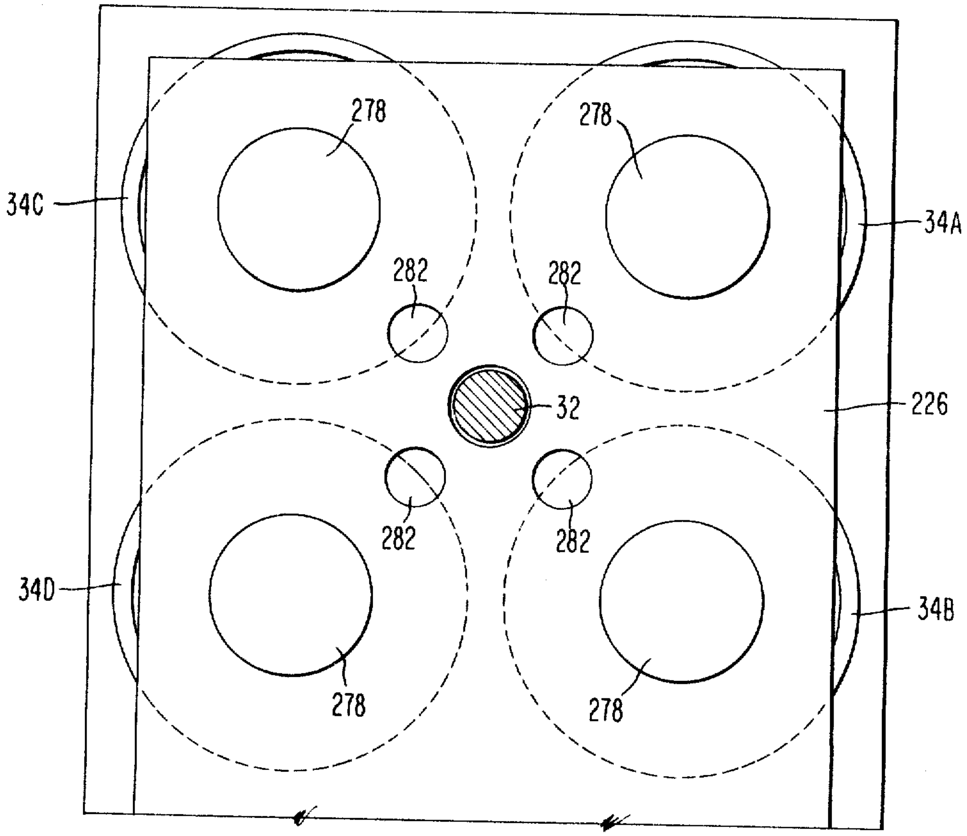
FIGURE 13 is a view taken along the line 13—13 of FIGURE 2 showing the collimating lenses and cathode ray tubes used in the oscillographic portion of the present apparatus.
Figure 14:
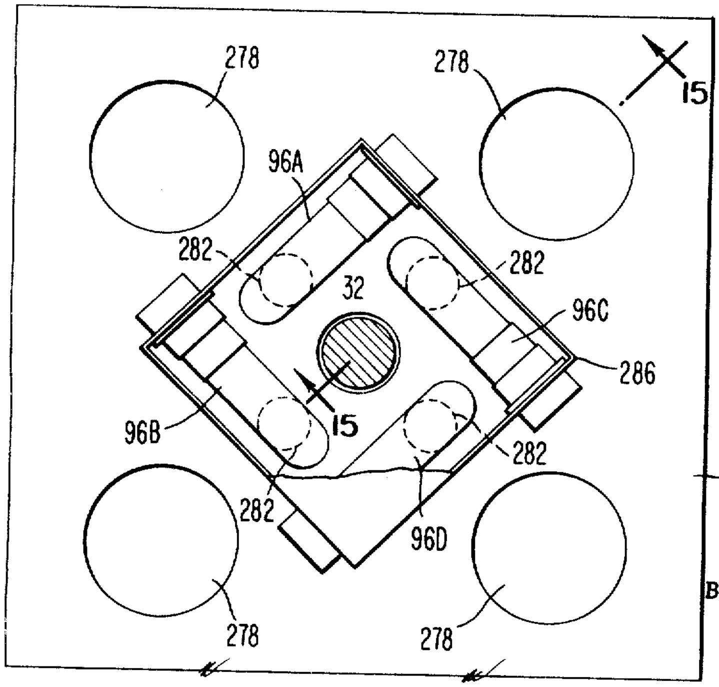
FIGURE 14 is a view taken along the line 14—14 of FIGURE 2 showing the arrangement of the photo-multiplier tubes used in the present invention.

The oscillographic apparatus 30, FIGURE 1 is described hereinbelow from the point of view of its structural operational relationship with the other parts of the system. The oscillographic mechanism in the present preferred embodiment is arbitrarily divided, for purposes which will become clear subsequently, into a "weight read section" and a "weight change record" section. This mechanism includes four photo-tubes and four cathode ray tubes arranged as seen in FIGURES 13 and 14.

As has been noted hereinbefore, the oscillographic mechanism also includes 16 microscopic objectives 260 circularly disposed at a changing radius around the periphery of wheel 254 which is disposed adjacent wheel 250 carrying 16 light pipes 270 of varying length, the input of which is substantially in line with a respective one of the lenses 260. Wheels 250 and 254 are mounted on a common hub 256 and the ends 272 of the light pipes come out through the front of the hub at a much smaller radius than the input. Bulkhead 226 adjacent the lens bearing wheel 254 carries four condensing lenses 282 and four collimating lenses 278. At the focus of the collimators are located the four cathode ray tubes 34A–34D. The four photo-multiplier tubes 96A–96D are arranged about shaft 32 to image the light from the light pipes 270 through lenses 282 as seen in FIGURE 14. The inboard bulkhead 224 carries registration pads 244 in the form of dowels and spring holding means for the four photographic plates. 246. Since the photoplates are at the focus of the microscope objectives, a point on a cathode ray tube is imaged on a photoplate by a respective lens. Thus, as the shaft 32 rotates, this point will sweep the photoplate. It is quite apparent that there could be more than four or only one or ten or as many as is desired. As the lenses pass in front of the photoplate located behind a window in the second bulkhead, the image of the point on the cathode ray tube sweeps across the plate. Since each lens is located at a different radius, as it goes by, it sweeps a different track or path 338 FIGURE 16.

Figure 17:
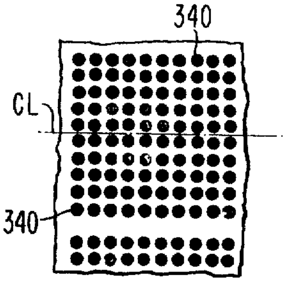
FIGURE 17 is a detail view of the portion of the track enclosed by the circle 17.

The spacing between the tracks 338 which is determined by the radial spacing of the lenses 260 is made sufficiently great so that a plurality of positions for the spot images 340 is available on each side of the center lines, FIGURE 17. Selectively positioning the CRT spot to different radial positions by means of the controller 114 permits spots to be written on a plurality of tracks—10 are illustrated—and these spots may likewise be read by repositioning the CRT beam to the location it had when the spots were written. By controlling the intensity of the cathode ray beam multiple images 340 are or may be recorded on the film or plates which can then be processed as variable density negatives or positives. As will be apparent later on herein, the light coming from the CRT through that particular spot 340 will vary in intensity and will return through the light pipe through the condenser lenses onto the respective photo-multiplier 96A–96D for purposes still to be described.

NETWORK PROCESSOR OPERATIONAL MODE

It is assumed for purposes of clarity and understanding in the description which follows hereinafter that the present apparatus is set up as described in connection with the earlier description of FIGURE 1 and that each of the operational sections or functioning portions of the apparatus includes the necessary or required processed distributor photoplates.

Energization of motor drive means 126 through cam switch 315A causes shaft 32 to revolve. This action causes timing track phototube 110 through cam switch 315F to produce an output pulse as the timing track aperture 336, FIGURE 7C registers with the slit image 212. Electrical signal flows from the tube 110 over line 108 to sequencing circuits 98. Output signals from circuits 98 flow over line 106 to counter (A) 36 and thence over line 40 to counter (B) 38. At the end of an arbitrary count of, for example, 16, an output pulse is derived from counter (A) which advances counter (B) one count. Assuming that there are 8,192 timing track apertures 336, FIGURE 7C then counter (B) is enabled to count up to 512, i.e., 8,192 divided by 16, the original count. Thus, in the course of one revolution of shaft 32, counter (B) will count from zero to 511.

As seen in FIGURE 1, each time a count pulse is derived from counter (A) not only does it drive counter (B) but it also flows over line 42 to pulse height modulator 44 and over line 56 to inverter 54 thence via line 58 to pulse height modulator 46. By virtue of invertor 54, each time counter (A) output stage changes (every 16 counts it changes from positive to negative and vice versa) a pulse is supplied alternately to PHM 44 or 46.

Output lines 48 and 50 are fed to an "OR" gate 52 which permits the positive going pulse that comes from the PHM 44 and 46 to pass through (ignoring the negative outputs) to line 60 the Z input of storage tube 20. Simultaneously with the foregoing operation, phototube 18 produces a modulating output over line 19 to PHM 46. This modulating signal varies as a function of the intensity of the light with respect to whatever "copy" is disposed in area 16. Thus output line 60 will have on it a signal which causes the brightness of a spot of light from the cathode ray tube 20 to vary in accordance with these two signals.

From sequencing circuits 98, output line 102 carries a pulse to "weight read channel" CRT 34B input 104 causing the cathode ray beam spot on the face of this tube to brighten. The output from CRT 34B is collimated by lenses 278 and imaged by the lenses 260 onto the weight plates 246, which will modulate this light from the tube so that it is variably transmitted depending upon the variation in density of the recorded spot 340. This transmitted light is thence collected by light pipes 270 and returned by condensing lenses 282 to phototube 96. The output signal on line 94 from phototube 96, suitably amplified, is fed to the weighting function apparatus 64. Simultaneously, phototube 92 of distributor 28 is generating output signals by means of the selective apertures in the distributor plates receiving light from storage tube 20. These signals, suitably amplified, are fed over line 90 into weighting function apparatus 64.

Weighting function apparatus 64 is adapted to provide an output as a result of some weighting of the two input signals. This weighting may be simple multiplication of one signal by the other or the weighting may comprise adding the two signals together and applying a threshold thereto such that if the signal is greater than some value, it is permitted to proceed by its excess amount. If it is not, then no output is taken out of the weighting function, apparatus 64.

From apparatus 64 a signal is applied to an alternate invertor 68 over line 66. The latter apparatus produces alternate positive and negative going signals for the serially applied input signals. On the "odd" count it puts the signal through as is, and on the "even" count it puts the signal through inverted. The output of the alternate invertor 68 is fed out over line 70 to integrator 72. The output of the integrator changes as a function of the signals that come to it from the alternate invertor. Conveniently, the integrator may have both a positive and a negative limit on it so that its output cannot rise or fall beyond such limit. The output of the integrator is fed over line 74 to pulse height modulator 44 and is used to control the height of the pulse that is put out by pulse height modulator 44.

Output line 60 from "OR" gate 52 thus will have on it a signal alternately from PHM 44 and 46 which is effective to cause the brightness of the spot of light on CRT 20 to vary in accordance therewith. In this manner, complex signal loops can occur in the machine as the signals consecutively recovered by photo cell 92 originating from the storage field 22, pass through the weighting function apparatus, the alternate invertor, the integrator, the pulse height modulator and back to the storage tube. That is one complete loop. Such loops may involve several passes through the machine since the point of origin for such signals is not necessarily the point of destination in the field 22. These loops may be positive or negative. In each case there is a transformation of the information by virtue of the integration operation and the weighting functions. This operation becomes a simulation of the flow of information in a cross coupled network.

Simultaneously with the writing of the element output back into the element output field of the display storage tube, signals derived from the integrator 72 and the alternate invertor 68 over lines 82 and 80, respectively, are delivered to the weight modification function apparatus 78. The weight modification apparatus 78 provides means for increasing, decreasing or not producing an output depending on how the apparatus is planned and set up. Depending on the desired weight modification an output signal is delivered onto line 84 from weight modification apparatus 78 and this signal together with a signal from sequencing circuits 98 over line 100 are applied to a sampling gate 86. The sampling gate will produce a write pulse output on line 88 which may be of uniform amplitude or may be of varying amplitude depending on the weight modification function. This signal then appears as the Z input of cathode ray tube 34A in the "weight change record" section of oscillographic mechanism 30 producing a brightening of the spot on tube 34A. By this means an increment of exposure is recorded at the specific location on a new weight plate in that section of the oscillographic mechanism, derived from what has previously been identified as the weight change record channel.

Periodically, at the discretion of the experimentor, plates in this weight change record channel are removed from the apparatus and processed either as positives or negatives as one chooses. However, in the present instance, the apparatus is directed to negative processing. Thereafter the new weight plate is placed back in the same location in the machine on its registration banking pads.

It is now possible by utilization of appropriate apparatus, such for example, as phototube 122 and summing device 124 as shown by means of the dotted line interconnecting the summing device with line 94, to sum the values in the weight plate now in the weight read channel with the values in the weight change plate in the weight change record channel and by this means expose in a third of the four channels a new weight plate which is essentially the old weight plate modified by the weight change signals which were recorded in the weight change channel. This third channel recording while shown only schematically in FIGURE 13, employs the same functions and apparatus as that used for the weight read and the weight change record channels earlier described.

Thereafter, the density information from the newly derived weight plate is or may be fed into line 94 by suitable switching means (not shown) as an input to the weighting function device 64 in the manner hereinbefore set forth. By this means the apparatus is now available to run through new adaptation cycles.

The deflection direction for the cathode ray tubes 34A–D is defined as being radial and/or tangential with respect to the drive shaft 32. The tubes are normalized relative to the tangential deflection. Radial deflection adjustment is provided by means of manual input device 114 over the leads 116, 118 and 120, etc. This apparatus provides a range of radial deflection such that approximately 10 discrete spot positions are or may be imaged on the plates of the oscillographic section, in a manner such that there are approximately five spots above or below a center line through the group of spots as seen in FIGURE 17. Thus if it is assumed that the cathode ray tube radial deflection for each of the tubes 34A through 34D is centered with respect to a respective collimator, the spot of light from the tube will fall on the center line. By deflecting it inwardly and outwardly, it is possible to reach any one of ten discrete channels spaced as seen in FIGURE 17. Each one of these discrete tracks has a radial separation which is the same as the radial separation between the lenses 260. The tubes 34A–D are disposed at infinity as seen by the lenses on the wheel.

The number of tracks (10) is sufficiently small so that one band of 10 tracks produced by one lens 260 does not overlap the band of ten tracks that may be produced by the next radially displaced lens. It is likewise possible to replace the manual selection device by a stepping switch so that there is a gradual change of the radial input deflection of CRT 34A. It becomes apparent from the foregoing that on consecutive revolutions of shaft 32, the spot will be located at a new position and thus the phototube will be looking at or reading a new and discrete track.

If the connections between counter B and the digital to analog convertor 62 are interchanged, as for example, by the aforementioned stepping switch, then the locations in the element output field to which the information on line 60 is directed will likewise be changed i.e. altered by the scrambling caused by the interchange of the bits in counter B as connected to the D to A convertor. Since the distributor 28 draws its inputs as a function of the location of the information carrying light signals on tube 20, it can be considered to be a geometrical selector. Thus when that geometric location is altered, even though this alteration itself may be systematic, the distributor effectively sees a new set of inputs. This new set of inputs differs from the previous inputs by the fact that each one of the locations on the tube 20 has a different origin for its data. Since there is no need for strict or systematic relationship between the origin and the destination of the signals on field 22B, the reassignment of location by the interconnection changes between the counter B and the D to A converter 62 effectively engenders a whole new connectivity, thus a whole new network. When this method is employed, revolution by revolution, on each consecutive turn or after a certain number of turns of the distributor, shaft 32, the network processor functions essentially as a layered network. A layered network is defined as one in which there is information flow from one particular layer of a network through to some other layer of the network with, in general, a forward trend i.e. when there is communication of information from one layer to the next, but not from the latter to the former, unless it is by virtue of consecutive layering and reentry through the top layer.

In summary, the device and circuit structures herein described can be utilized in many different ways or experimentation and for applications, some examples follow: The operator may learn to recognize the significance of the patterns that appear in the field 22B of tube 20 which is essentially a map of the output states of the network processor. He may choose to apply certain subjective or objective criteria to the pattern or sets of values that he observes. He may then attempt to devise empirically or by logical analysis weight modification routines. He can apply them and continue to observe on the display storage tube 20 the effect of the application of these weight modification routines to the apparatus. Other automatic devices can be used for monitoring the output field which is also available as an input field for the distributor. For instance, a monitoring device can observe the average level of certain fractions of the field and use these by conventional summation and threshhold as coded outputs which can then be correlated with the input functions placed in the flying spot scanner 12. Various signal states are available in the course of the operation of the distributed network processor as electrical signals so that other methods for automatic output or for collating the consecutive states and signals that occur in the machine may readily be devised.

The type of output and the class of weight modification function which can be used in conjunction with this device, will depend on the specific application and on the results of the research that this machine allows to be done. Considering the fact that there exists today, no reliable mathematical analysis of cross-coupled multi-layered networks, using this machine it would be possible to develop such empirical networks. The device is quite readily adaptable to the utilization of local criteria in the weight modification function. One such routine consists in testing each input for its cooperative effect on the output of the integrator 72. The criterion for merit being that the integrator should tend to return to a value close to that of its previous states. This would tend to make the network operate, for example, as a low pass filter which is quite analogous to the basic process of classification of input functions.

The characteristic of the classification process is to receive as input functions, that is patterns in this instance, which have redundant or noise information included and variants on their basic characteristics and in the course of passing these functions through the network of causing the signal patterns to be reduced to one of low complexity, i.e., of relatively simple coding.

There has thus been described a high density neural network simulation apparatus wherein the operator-experimentor can readily vary the parameters of the network during any experiment in response to observations of what is happening in the experiment.

The operator has the capability of manually adjusting the integrator time constants, the pulse height modulator characteristics as well as the weight modification function. The present invention thus tends to approach the activity which is believed to take place in a biological neuron in so far as connections and elements are concerned.

What is claimed is:

1. High density adaptive random network simulation apparatus wherein a connectivity pattern routine is specified by light sensitive members and wherein the transfer function of neuron-like network nodes is executed by means of electronic circuits adapted to be consecutively connected to specified weighted input and output points in said network whereby the network may be effectively cross coupled and/or layered comprising,
   output storage means for temporarily storing an array of spots of light of varying intensity representing the output signals of a neuron-like network,
   electronic scanning means for providing an input stage function to said storage means of signals representing elements of said neuron-like network,
   connectivity distribution means for selecting one or more light signal points from said input stage and/or said output stage effective to determine the connectivity of the network by specifying the origin of the signal and selectively passing said signal therethrough,
   element transfer function means operative to assume cyclically the role of each neuron-like element of the network effectively operating on sets of signal inputs and providing an output signal for display on said output storage means, and
   weight change function means effective to control the addition, subtraction and/or integration of weight change increment signals to said input means thereby making weighting signals available to the transfer function means in synchronism with the signals transmitted through said distribution means for adaptively modifying said signals as desired or ordered by a prescribed network simulation routine.

2. The invention in accordance with claim 1 wherein said output storage means comprises a cathode ray tube having a display screen thereof arbitrarily subdivided into a plurality of discrete areas for displaying signals thereon as point sources of light.

3. The invention in accordance with claim 1 wherein said electronic scanning means includes a cathode ray tube flying spot scanner and a photosensitive light responsive device operably associated therewith, and means interconnecting the same to said output storage means for application of signals therefrom to said storage means.

4. The invention in accordance with claim 1 wherein said connectivity distribution means includes light transmitting means, photosensitive signal responsive means operably associated with said light transmitting means, and means to move said light transmitting means relative to said photosensitive means effective to cause light signals from said output means to activate said light responsive means when a connectivity path is established therebetween.

5. The invention in accordance with claim 1 wherein said element transfer function means includes programming means operably associated therewith, digital to analog conversion means, counter means interconnected with said digital to analog conversion means to receive the output from said digital to analog conversion means, and means for interconnecting said digital to analog conversion means in a manner effective to apply to said digital to analog conversion means the output from said flying spot scanner and said output storage means effective to alter the signal displayed on said output storage means.

6. High density adaptive random network simulation apparatus wherein a connectivity pattern routine is specified by light sensitive members and wherein the transfer function of neuron-like network nodes is executed by means of electronic circuits adapted to be consecutively connected to specified weighted input and output points in said network whereby the network effectively may be cross coupled and/or layered, comprising,
   digital input means including a tape punch, a tape reader and register means and means interconnecting said means for information data flow therethrough,
   display storage means for temporarily storing an array of spots of light of varying intensity representing the output signals of a neuron-like network,
   network input scanning means for providing an input stage function to said storage means of signals representing elements of said neuron-like network,
   connectivity distribution means for selecting one or more light signal points from said storage means and/or said digital input means effective to provide a pattern of connectivity for the network by specifying the origin of the signal and for selectively passing said signal therethrough,
   element transfer function means operative to assume cyclically the role of each neuron-like element of the network effectively operating on sets of signal inputs and providing a modified output signal for display on said output storage means,
   weighting function means operably associated with weight modification function means,
   oscillographic means operably interconnected with said weight modification function means and including weight change read means and weight change record means effective to generate new weights for said input signals and to control the addition, subtraction and/or integration of weight change increment signals applied to said input means thereby making weighting signals available to the transfer function means in synchronism with the signals transmitted through said distribution means for adaptively modifying said signals as desired or ordered by a prescribed network simulation routine.

7. The invention in accordance with claim 6 wherein said connectivity distribution means further includes first and second rotatable members carrying one or more photosensitized members and optical means associated therewith effective to register discrete bits of signal information from said display storage means on a light responsive member operably associated therewith, and position oriented data tracking means coupled to said distribution means to provide a positive position check on the signal data recorded on said photosensitized members.

8. The invention in accordance with claim 6 wherein said element transfer function means includes first and second counter means operably associated with digital to analog converter means for receiving signals from said connectivity distribution means effective to set the state of the digital to analog converter means for controlling the deflection of the beam of the cathode ray tube storage means.

9. The invention in accordance with claim 6 wherein said oscillographic means further comprises rotatable disk-like members mechanically operably associated with said connectivity distribution means and operable conjointly therewith, photosensitive means carried by said rotatable members and optical means associated therewith, one or more cathode ray tubes arranged adjacent to said rotatable members so that light signals from a cathode ray tube can be made to record upon and to be read from the photosensitive means through said optical means, and light responsive means to which the signals from a cathode ray tube are applied operably associated with said transfer function means and said weighting function means for altering the experimental routine being processed by the simulation apparatus.

10. The invention in accordance with claim 6 wherein said connectivity distribution means comprises first and second rotatable disk-like members, drive means for rotating said members, counter means to indicate the relative position of said members, demountable photographic light sensitive members carried by said rotatable members and an optical system operably associated therewith for causing light signals from said storage display means to be projected through said photosensitive members when the light transmitting areas of said light sensitive members is in registry, and means coupling said first and second disk-like members to said oscillographic means for synchronous rotation therewith.

11. High density adaptive random network simulation apparatus wherein a connectivity pattern is specified by light sensitive members and wherein the transfer function of neuron-like network nodes is executed by means of electronic circuits adapted to be consecutively connected to specified weighted input and output points in said network whereby the network effectively may be cross coupled and/or layered, comprising, cathode ray tube flying spot scanner input means operably associated with a photomultiplier providing an input stage for introducing data into the apparatus system, cathode ray tube storage and display means to which the output of said flying spot scanner photomultiplier is fed for displaying an input function on a portion of said cathode ray tube screen as a value of illumination of varying intensity, a network connectivity distributor, first and second photographic record means demountably carried by said distributor, first photo optical means operably associated with a said record means effective in one mode of operation to expose said record means to light from said cathode ray tube storage means and in another mode of operation selectively to transmit light from said cathode ray tube storage means through those areas of the exposed record means which are in register, second photo optical means operably associated with said distributor means effective to record timing track information upon said record means, photomultiplier means associated with said first and second photographic record means to which light signals from said cathode ray tube screen are applied as a result of the registry of said areas of the record members, oscillographic means including a plurality of rotatable members the latter being synchronously operably coupled to said distributor means for conjoint operation therewith, photographic record means demountably carried by said plurality of rotatable members, photo optical means operably associated with said photographic record members, cathode ray tube means disposed adjacent to said oscillographic means and operably associated therewith in a manner such that light signals may be passed from said last named cathode ray tube through said photo optical means to operably associated photomultiplier means disposed in the optical pathway therefrom, said last named photomultiplier means being responsive to light signals resulting from the registry of certain areas of said last named photographic means, summing means for summing the light signal outputs from said cathode ray tubes, and means for manually adjusting the intensity of illumination of the display of said cathode ray tubes thereby to alter and change the connectivity pattern resulting from the network simulation being performed.

References Cited

UNITED STATES PATENTS

| | | | |
|---|---|---|---|
| 2,646,465 | 7/1953 | Davis et al. | 179—16 |
| 3,046,527 | 7/1962 | Rowley et al. | 340—172.5 X |
| 3,097,349 | 7/1963 | Putzrath et al. | 340—172.5 |
| 3,106,699 | 10/1963 | Kamentsky | 340—172.5 |
| 3,157,855 | 11/1964 | Rabinow | 340—146.3 |
| 3,158,840 | 11/1964 | Baskin | 340—172.5 |
| 3,166,640 | 1/1965 | Dersch | 179—1 |
| 3,191,149 | 6/1965 | Andrews | 340—146.3 |
| 3,191,150 | 6/1965 | Andrews | 340—146.3 |
| 3,209,328 | 9/1965 | Bonner | 340—146.3 |

ROBERT C. BAILEY, *Primary Examiner.*

P. J. HENON, *Assistant Examiner.*